Nov. 23, 1948.  V. J. PRICE  2,454,476
ANIMAL TRAP
Filed Jan. 28, 1944
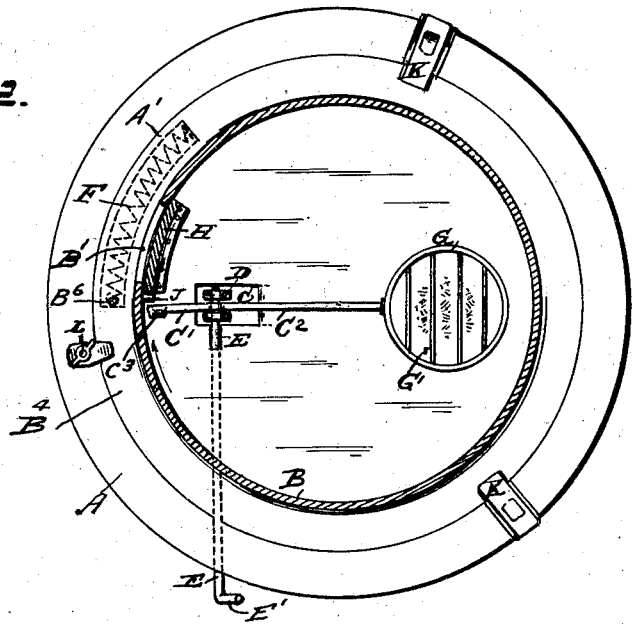
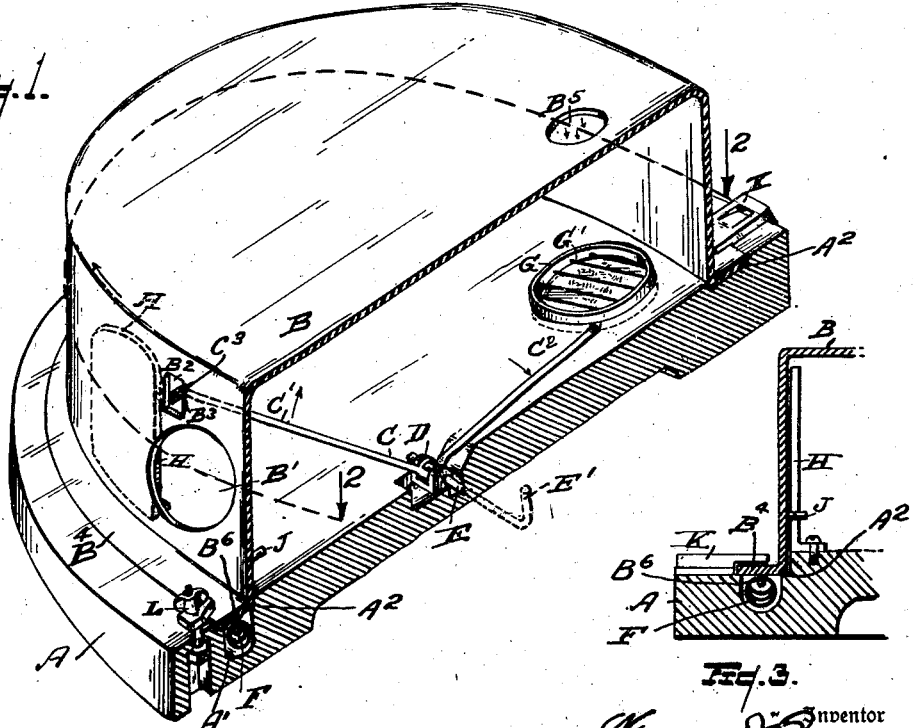
Inventor
Vernon J. Price
By
Attorney Patented Nov. 23, 1948

2,454,476

UNITED STATES PATENT OFFICE 2,454,476

ANIMAL TRAP

Vernon J. Price, West Dearborn, Mich.

Application January 28, 1944, Serial No. 520,046

3 Claims. (Cl. 43—60)

My invention relates to an improvement in animal traps, and more particularly to rat or mouse traps; shown in the accompanying drawings and hereinafter described and pointed out in the following specification and claims.

In the drawings—

Figure 1 is a fragmentary perspective view of the trap with parts shown in section.

Figure 2 is a horizontal sectional view of the trap taken on line 2—2 of Figure 1.

Figure 3 is a fragmentary sectional view of the trap, showing the annular flange of the rotatable chamber seated in an arc-shaped recess in the base plate of the trap.

Referring now to the letters of reference indicating the several parts shown in the drawings:

A, denotes the base plate of the trap, on which is mounted a partially rotatable spring actuated chamber B, having an inlet opening B' in its side wall for the admission of rodents into the chamber.

C, denotes a tripping mechanism, adapted to maintain the spring actuated rotatable member B in an "open door" position to permit the entry of rodents into the chamber; but which is adapted to instantly release the rotatable chamber from its "open door" to a "closed door" position, upon a rodent nibbling or displacing the bait upon the tilting-pan G', thereby releasing the tripping mechanism.

The tripping mechanism C, consists in an integral pair of forked V-shaped arms $C'$—$C^2$, supported in a bearing D, secured to the base plate A.

Extending horizontally from the bearing D, and engaged to the forked-arms $C'$—$C^2$, is a manually operated rock-shaft E, shown in cross-section near the bearing D, but is shown extended in broken lines beyond the edge of the base A, with a crank-arm E' at its outer end, whereby a V-shaped knife end $C^3$ may be rocked into a slot $B^2$, in the wall of the inverted pan-shaped chamber B, to engage the round edge $B^3$, in the side wall of the opening $B^2$, and though the frictional resistance between these are thus reduced, it is sufficient to maintain the rotatable chamber B, in its "open door" position against the action of a tension spring F, lodged in an arc-shaped groove A' in the base plate A, beneath the flange $B^4$, which is integral with the pan-shaped chamber B.

The tension spring F, is secured to the end wall of the groove, and at its opposite end is connected with a pin $B^6$, attached to the underside of the flange $B^4$, projecting downwardly into said groove.

Attached to the end of the forked-arm $C^2$, is a bait-pan G, which is preferably provided with a plurality of spaced guard-wires G', to make it difficult for a rodent to secure the bait, without disturbing the rocking arms C' and $C^2$ thereby insuring instant, quick release of the tripping mechanism.

A stationary door H is secured to the base A within the inverted pan-shaped chamber and so located in relation to the opening B' in the wall of the chamber that the forked arm C' of the tripping mechanism will be rocked out of the slot $B^2$, by a rodent tilting the bait-pan G, whereupon the spring actuated chamber B is released, and the chamber is instantly rotated through the action of the tension spring F, thereby bringing the opening B' in the side wall of the chamber into registration with the stationary door H; thus closing the trap against escape of the rodent.

A stop-pin J, projecting inwardly from the wall of the spring-actuated chamber B, contacts the stationary door H, and serves to arrest and limit the rotation of the chamber.

An opening $B^5$, in the upper wall of the rotatable chamber registers with the tilting bait-pan G, below, through which the bait may be replenished as required, without detaching the rotatable chamber from the base.

Suitable fastening devices may be employed to secure the inverted pan-shaped chamber B to the base A—for example: A thumb-nut L, which may be turned to overlap the flange $B^4$ of the chamber B; or slidable bolts K, supported in grooves formed in the base A, and adapted when adjusted to overlap the flange $B^4$, to detachably connect the chamber B to the base, may be employed as preferred.

The captured rodent may be drowned while in the trap by submerging in a pail of water.

To reset the trap following the removal of the dead rat, the rotatable chamber B is manually turned upon the base A, in a direction opposite to that indicated by the arrows (which show the direction taken by the rotatable chamber B, when released upon trapping a rodent), then by a manual adjustment of the shaft E shown extended in dotted lines from a point adjacent to the bearing D, the V-shaped knife edge end $C^3$, at the outer end of the arm C' may be rocked by the crank arm E' at the outer end of the shaft E, into the slot $B^2$, in the wall of the rotatable chamber B, to engage the rounded edge $B^3$ of the side wall of the slot, thus "setting" the trap, until again released through the capture of a rodent.

Having thus described my invention, what I claim is:

1. A device of the character described comprising a base plate having an annular groove; a rotatable chamber having a flange lodged in the annular groove of the base plate; an inlet opening in the wall of the chamber to admit rodents into the chamber; a stationary door; a spring adapted to rotate the chamber; a stop pin extending inwardly from the wall of the chamber to limit the rotation of said chamber upon the inlet opening of the chamber registering with the stationary door; a manually operated rock-shaft fitted with a pair of rocker arms; a bearing for the rocker arms attached to the base plate; one of said rocker arms having a laterally extending knife edge at its outer end; a slotted opening in the wall of the chamber, through which said knife edge may enter to engage the wall of the chamber, whereby said chamber is held under tension of the spring until released; and means including a bait supporting pan attached to the other arm, whereby a rodent upon attempting to remove the bait will cause the arms to rock, thereby releasing the rotatable chamber under tension of the spring, whereby the inlet opening into the chamber is closed upon registration with the stationary door against the escape of rodents from the trap.

2. In a device of the character described, a base plate having an annular groove, a rotatable chamber having an opening in its wall to admit rodents into the chamber and an annular flange to support the chamber in the annular groove in the base plate; an arcuate groove in the base plate below the flange of the chamber; a spring lodged in the arcuate groove in the base plate connected with the flange of the rotatable chamber; a stationary door secured to the base plate, adapted to close the opening in the wall of the chamber against the escape of rodents upon rotation of the chamber with its opening being in registration with the stationary door; means controlling the setting and release of the rotatable chamber, comprising a pair of rocker-arms, a bearing for the rocker-arms secured to the base plate, a slot in the wall of the chamber through which the outer end of one of said rocker arms may project to engage the wall of the slot, whereby the chamber is held against rotation due to the urge of the spring until released by the rocking of said one rocker arm; a bait supporting means carried by the other rocker arm, adapted to be rocked by a rodent upon attempting to secure the bait, thereby disengaging the end of the rocker-arm contacting the wall of the slot in the chamber, whereby the chamber is free to rotate under the urge of the spring thereby closing the opening in the chamber against escape of rodents trapped therein; and a manually operated rock-shaft journaled in the bearing, whereby upon a manual rotation of the rock-shaft the rocker-arms may be again set to secure the rotatable chamber until released as before.

3. A device of the character described comprising a base plate; a rotatable chamber lodged in the base plate, having an opening to admit rodents into the chamber; a stationary door secured to the base plate; a spring adapted to rotate the chamber whereby the inlet opening may be closed against escape of rodents trapped in the chamber upon said opening in the chamber registering with the stationary door; a bearing attached to the base plate; a manually operated rock-shaft fitted with a pair of rocker-arms journaled in said bearing, one of said rocker-arms having a lateral knife-edge extension at its outer end; a slotted opening in the chamber wall having its edge rounded to receive said knife edge extension of one of the rocker arms upon the arm being manually rocked into said opening, whereby the spring controlling the rotation of the chamber is held under tension to set the trap until released by a rodent disturbing the rocker-arms on attempting to remove the bait; a bait-pan fitted to the other rocker-arm provided with a plurality of guard wires above the bait lodged in the pan, whereby the bait cannot be readily removed, thereby insuring an active release of the rotatable chamber held under tension; and an opening in the upper wall of said chamber adapted upon a manual rotation of the chamber to be brought into registration with the bait pan below, whereby bait may be dropped through the opening in the chamber to replenish the bait pan below without removing the rotatable chamber from its supporting base plate.

VERNON J. PRICE.

REFERENCES CITED

The following references are of record in the file of this patent:

UNITED STATES PATENTS

| Number | Name | Date |
|---|---|---|
| Re. 4,113 | Lee | Aug. 30, 1870 |
| 83,642 | Lee | Nov. 3, 1868 |
| 210,578 | Terrell | Dec. 3, 1878 |
| 1,323,024 | Curtis | Nov. 25, 1919 |
| 1,659,767 | Curtis | Feb. 21, 1928 |
| 1,847,508 | Wilkerson | Mar. 1, 1932 |

FOREIGN PATENTS

| Number | Country | Date |
|---|---|---|
| 2,877 | Great Britain | 1871 |
| 207,057 | Great Britain | Nov. 22, 1923 |